United States Patent
Toda et al.

(10) Patent No.: US 7,327,241 B2
(45) Date of Patent: Feb. 5, 2008

(54) INDICATOR DEVICE FOR VEHICLE WITH AUTOMATIC TRANSMISSION

(75) Inventors: Isao Toda, Fuchu-cho (JP); Katsumasa Sogame, Fuchu-cho (JP); Takeshi Matsukawa, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 128 days.

(21) Appl. No.: 11/385,896

(22) Filed: Mar. 22, 2006

(65) Prior Publication Data

US 2006/0220810 A1    Oct. 5, 2006

(30) Foreign Application Priority Data

Mar. 29, 2005   (JP)   ............................. 2005-095194

(51) Int. Cl.
B60Q 1/00         (2006.01)
(52) U.S. Cl. ................ 340/438; 340/461; 340/456; 340/525; 340/815.4; 340/459; 74/335; 73/866.3
(58) Field of Classification Search ............... 340/438, 340/461, 456, 458, 459, 439, 441, 984, 462, 340/815.78, 815.73, 815.45, 815.4; 180/65.2; 74/335, 473.12, 473.18; 701/63; 116/286; 73/866.3; 345/6, 7, 9, 35, 633
See application file for complete search history.

(56) References Cited

U.S. PATENT DOCUMENTS 4,419,654 A    12/1983   Funk ........................ 340/438
4,798,160 A    1/1989   Mochida et al. ........... 116/28.1
6,883,393 B2   4/2005   Ishimaru ................... 73/866.3
7,180,408 B2   2/2007   Sonobe ...................... 340/438
7,236,089 B2   6/2007   Ono et al. .................. 340/461

FOREIGN PATENT DOCUMENTS

EP    1 491 799 A1    12/2004
JP    10-100725        4/1998

OTHER PUBLICATIONS

Hirokazu Nishizumi, Patent Abstracts of Japan, Publication No. 10100725 and Publication Date: Apr. 21, 1998.
Akira Watanabe, Patent Abstracts of Japan, Publication No. 2000103253 and Publication Date: Apr. 11, 2000.
Akira Suzuki, Patent Abstracts of Japan, Publication No. 2002002324 and Publication Date: Jan. 9, 2002.
European Search Report, dated Jul. 17, 2006.

*Primary Examiner*—Anh V. La

(57) ABSTRACT

Disclosed is an indicator device for a vehicle with an automatic transmission, which comprises a plurality of light-emitting elements 52a each adapted to be lighted up when one of P, R and N gear ranges corresponding thereto is selected, and a digital indicator 53 adapted to indicate an alphabet character "D" when a D gear range is selected, and indicate a numeric character representing a gear position when a M gear range (manual shift mode) is selected. The indication device of the present invention makes it possible to utilize a space of an instrument panel with higher efficiency and offer enhanced visibility for a driver, while avoiding increase in production cost.

10 Claims, 14 Drawing Sheets

INDICATOR DEVICE FOR VEHICLE WITH AUTOMATIC TRANSMISSION

BACKGROUND OF THE INVENTION

1. Field of the Invention

The present invention belongs to a technical field of indicator device to be disposed in a driver's side of a vehicle with an automatic transmission.

2. Description of the Related Art

Currently, a part of vehicles equipped with an automatic transmission (AT vehicles) are designed to be selectable between two shift modes: an automatic shift mode adapted to automatically shift between a plurality of gear positions according to a predetermined shift pattern; and a manual shift mode adapted to allow a driver to manually shift between a plurality of gear positions. For example, in this type of vehicles, a shift-lever position includes a P (parking) position, an R (reverse) position and an N (neutral) position, a D (drive) position and an M (manual) position, which correspond, respectively, to P, R, N, D and M gear ranges. After setting the shift lever in the M position, a driver can swingably move the shift lever in a first detection to shift to the next higher gear position or in a second direction to the next lower gear position, within the M gear range.

Japanese Patent Laid-Open Publication No. 10-100725 (hereinafter JP Publication 1) discloses an indicator device for such AT vehicles. This indicator device is installed in an instrument panel in front of a driver's seat to allow a driver seated in the driver' seat to visually check and recognize a selected gear range and a selected gear position, without largely changing a direction of the driver's eyes during driving. More specifically, the indicator device comprises a gear-range indicator section having five alphabet elements arranged vertically and linearly in a one-to-one correspondence with the P, R, N, D and M gear ranges and in this order. The gear-range indicator section is designed to selectively light up one of the four alphabet elements corresponding to the gear range selected under the condition where the auto shift mode is in a selected state. The indicator device further includes a digital indicator arranged below the lowermost alphabet element corresponding to the M gear range and designed to indicate a numeric character representing a gear position selected under the condition where the manual shift mode is in a selected state. This indicator device allows a driver to visually check and recognize each of the gear ranges selected under the condition where the auto shift mode is in a selected state, and the gear position selected under the condition where the manual shift mode is in the selected state.

The indicator device designed to linearly arrange the alphabet elements corresponding to all of the P, R, N, D and M ranges and place the digital indicator below the alphabet element corresponding to the M range, as disclosed in the JP Publication 1, involves a problem about difficulty of layout due to the need for ensuring a relatively large space in the instrument panel. Moreover, the gear-range indicator section having the alphabet elements corresponding to all of the gear ranges causes a problem about increase in production cost due to increase in the number of light-emitters for allowing the individual alphabet elements to be lighted up. Further, the linearly-arranged gear-range indicator section becomes longer due to the increased number of alphabet elements. Thus, when checking the indicator device, a driver has difficulty in recognize the gear range selected under the condition where the auto shift mode is in a selected state or the gear position selected under the condition where the manual shift mode is in a selected state, resulting in poor visibility.

SUMMARY OF THE INVENTION

In view of the above problems in an indicator device for a vehicle with an automatic transmission, it is an object of the present invention to provide an indication device capable of utilizing a space of an instrument panel with higher efficiency and offering enhanced visibility for a driver, while avoiding increase in production cost.

In order to achieve the above object, the present invention provides an indicator device for a vehicle with an automatic transmission, which is designed to be selectable between an automatic shift mode and a manual shift mode and to be selectable between a plurality of gear ranges. The indicator device comprises: shift-mode detector for detecting whether the manual shift mode is selected by a driver; gear-range detector for detecting each of the gear ranges selected by the driver in an operation for selecting the automatic shift mode; gear-position detector for detecting a gear position selected by the driver when the manual shift mode is in a selected state; and indicator for indicating each of the gear ranges selected in the operation for selecting the automatic shift mode, and the gear position selected when the manual shift mode is in the selected state, the indicator including a first gear-range indicator section which has a plurality of linearly-arranged alphabet and/or symbol elements adapted to be selectively lighted up so as to indicate either one of a non-drive gear range and a reverse gear range, or a combination of a plurality of linearly-arranged alphabet and/or symbol characters representing the non-drive gear range and the reverse gear range and a plurality of linearly-arranged light-emitting elements each disposed in side-by-side relation to a corresponding one of the alphabet and/or symbol characters, and a second gear-range indicator section adapted to indicate an alphabet character and/or a symbol character representing a forward gear range by using a plurality of segments; and indication controller for controlling the indicator in such a manner that, under the condition where the shift-mode detector detects that the auto shift mode is in a selected state, the first gear-range indicator section is operable, when the selection of either one of the non-drive gear range and the reverse gear range is detected by the gear-range detector, to light up one of the alphabet or symbol elements or one of the light-emitting elements which is corresponds to the selected gear range, and the second gear-range indicator section is operable, when the selection of the forward gear range is detected by the gear-range detector, to indicate the alphabet character and/or the symbol character representing the forward gear range, and, under the condition where the shift-mode detector detects that the manual shift mode is in the selected state, the second gear-range indicator section is operable to indicate the gear position detected by the gear-position detector.

In the above indicator device of the present invention, under the condition where the auto shift mode is in a selected state, the first gear-range indicator section is operable, when the selection of either one of the non-drive gear range and the reverse gear range is detected, to light up one of the alphabet or symbol elements or one of the light-emitting elements which is corresponds to the selected gear range, and the second gear-range indicator section is operable, when the selection of the forward gear range is detected, to indicate the alphabet character and/or the symbol character representing the forward gear range. Further, under the condition where the manual shift mode is in the selected state, the second gear-range indicator section is operable to indicate the detected gear position. This makes it possible to eliminate a layout space for an alphabet or symbol character or a light-emitting element for indicating the selection of the forward gear range so as to provide enhanced space efficiency of the indicator device and reduce the number of components to avoid increase in production cost. In addition, when the selection of the forward gear range is detected, at least either one of the alphabet and symbol characters representing the forward gear range is indicated in a highlighted manner in the second gear-range indicator section composed of a plurality of segments. This makes to possible to offer enhanced visibility for a driver when the forward gear range is selected.

These and other objects, features and advantages of the invention will become more apparent upon reading the following detailed description along with the accompanying drawings.

DETAILED DESCRIPTION OF THE PREFERRED EMBODIMENTS OF THE INVENTION

First Embodiment

Figure 1:
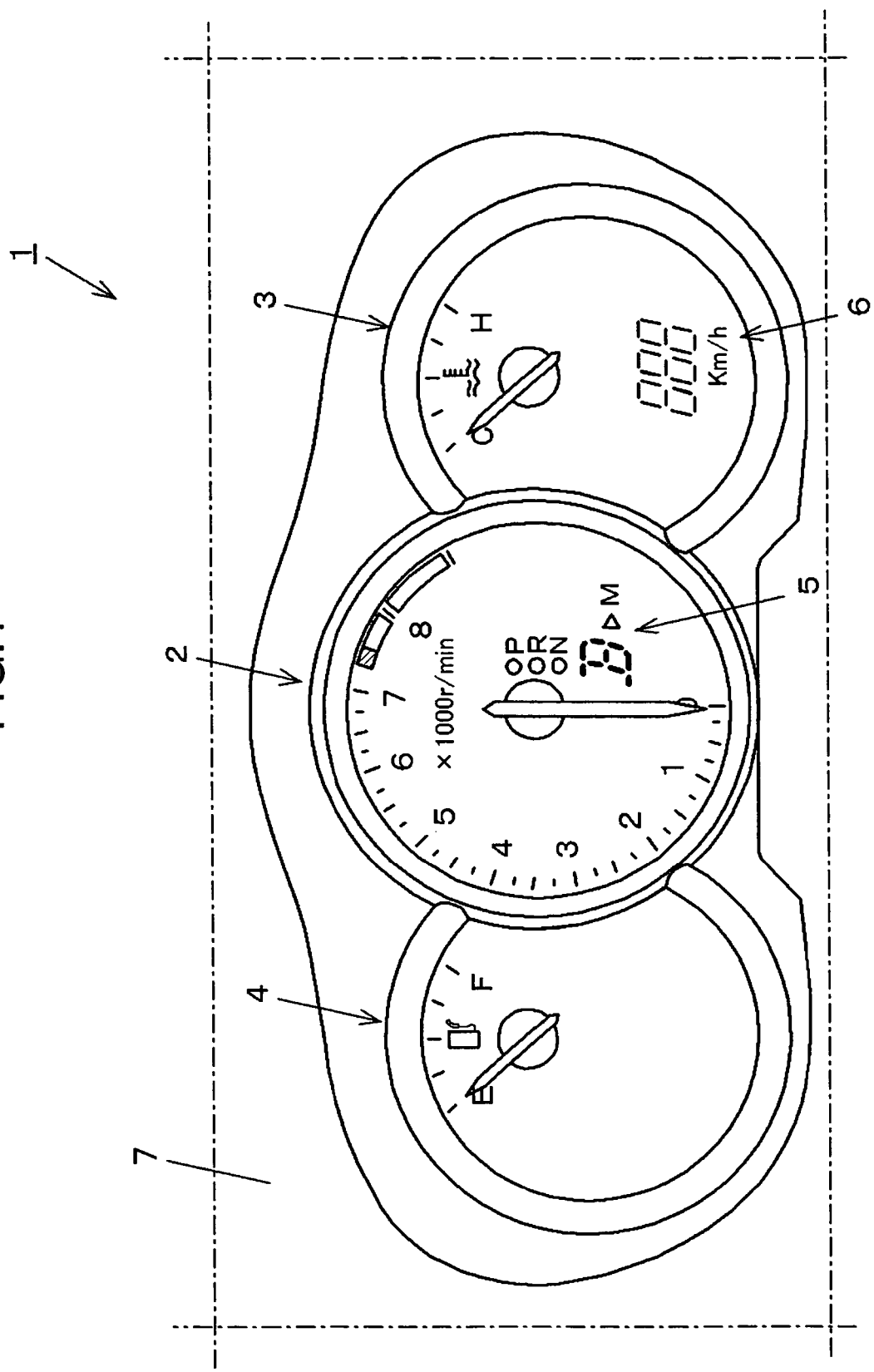
FIG. 1 is a general arrangement diagram of an indicator device according to a first embodiment of the present invention.

FIG. 1 shows an indicator device 1 according to a first embodiment of the present invention. The indicator device 1 is incorporated in an instrument panel 7 in front of a driver's seat in such a manner to allow a driver seated in the driver' seat to visually check and recognize an indication of the indicator device 1 without largely changing a direction of the driver's eyes during driving.

The indicator device 1 has a central region provided with a tachometer 2 for indicating a rotation speed of a crankshaft during engine operations, a right region provided with a coolant temperature gauge 3 for indicating a coolant temperature, and a left region provided with a fuel gauge 4 for indicating a remaining amount of fuel. Further, the indicator device 1 has an indicator cluster 5 for indicating a gear range selected by a driver and a gear position selected by the driver under the condition where an M gear range or a manual shift mode is in a selected state, or in, in an approximately central portion of the tachometer 2, and a speed meter 6 for indicating a vehicle speed, at a position below the coolant temperature gauge 3.

Figure 2:
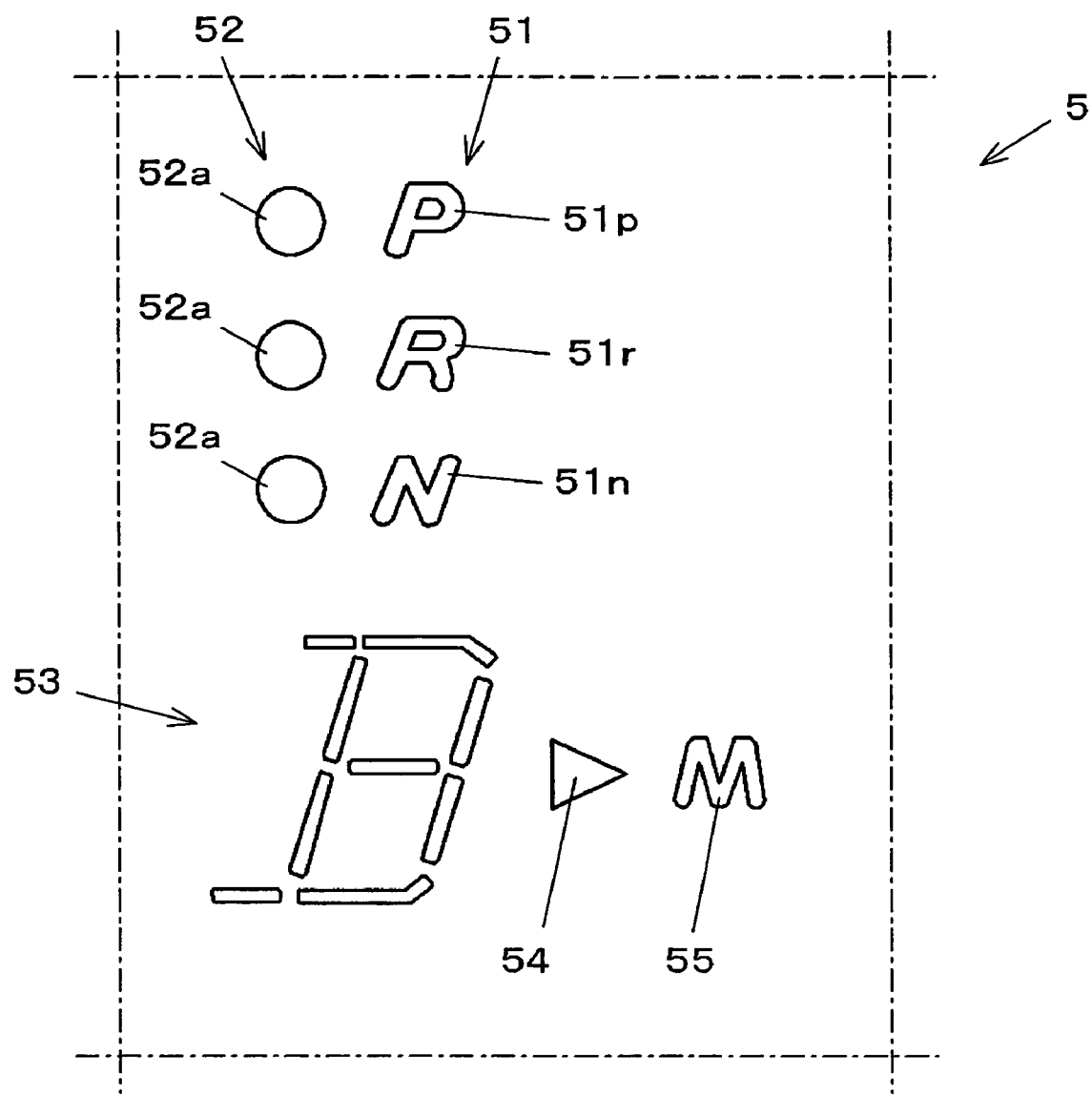
FIG. 2 is an enlarged view showing the arrangement of an indicator section of the indicator device.

As shown in FIG. 2, the indicator cluster 5 comprises a gear-range indicator group 51 consisting of three alphabet characters 5p, 5r, 5n arranged vertically and linearly in a one-to-one correspondence with P, R and N gear ranges and in this order. On the left side of the gear-range indicator section 51, the indicator cluster 5 includes a gear-range indicator lamp 52 consisting of three light-emitting elements (lamps) 52a, 52a, 52a arranged vertically and linearly in side-by-side relation, respectively, to the alphabet characters 5p, 5r, 5n and each adapted to be selectively turned on so as to indicate a corresponding one of the alphabet characters. On the under side of the gear-range indicator section 51, the indicator cluster 5 includes a digital indicator 53 for indicating a numeric character representing a gear position selected by the driver under the condition where the M gear range or the manual shift mode is in the selected state, by using a plurality of segments.

On the right side of the digital indicator 53, the indicator cluster 5 includes an arrowhead-shaped indicator 54 formed in a triangular shape and adapted to be selectively lighted up so as to indicate that the M gear range is selected in response to selection of the M gear range. On the right side of the arrowhead-shaped indicator 54, the indicator cluster 5 includes an M gear-range indicator indicating an alphabet character "M".

In the indicator cluster 5 illustrated in FIG. 2, the digital indicator 53 is designed to indicate an alphabet character "D" in response to selection of a D gear range or indicate a numeric character representing a gear position during selection of the M gear range, in a larger visual size than that of each of the light-emitting elements 52a, 52a, 52a of the gear-range indicator lamp 52 to be lighted up in response to selection of a corresponding one of the P, R and N gear ranges.

Further, the indicator cluster 5 is designed such that, when the M gear range is selected, while the M gear-range indicator 55 is not lighted up, the arrowhead-shaped indicator 54 on the left side of the M gear-range indicator 55 is lighted up so as to allow the driver to recognize the selection of the M gear range.

Figure 3:
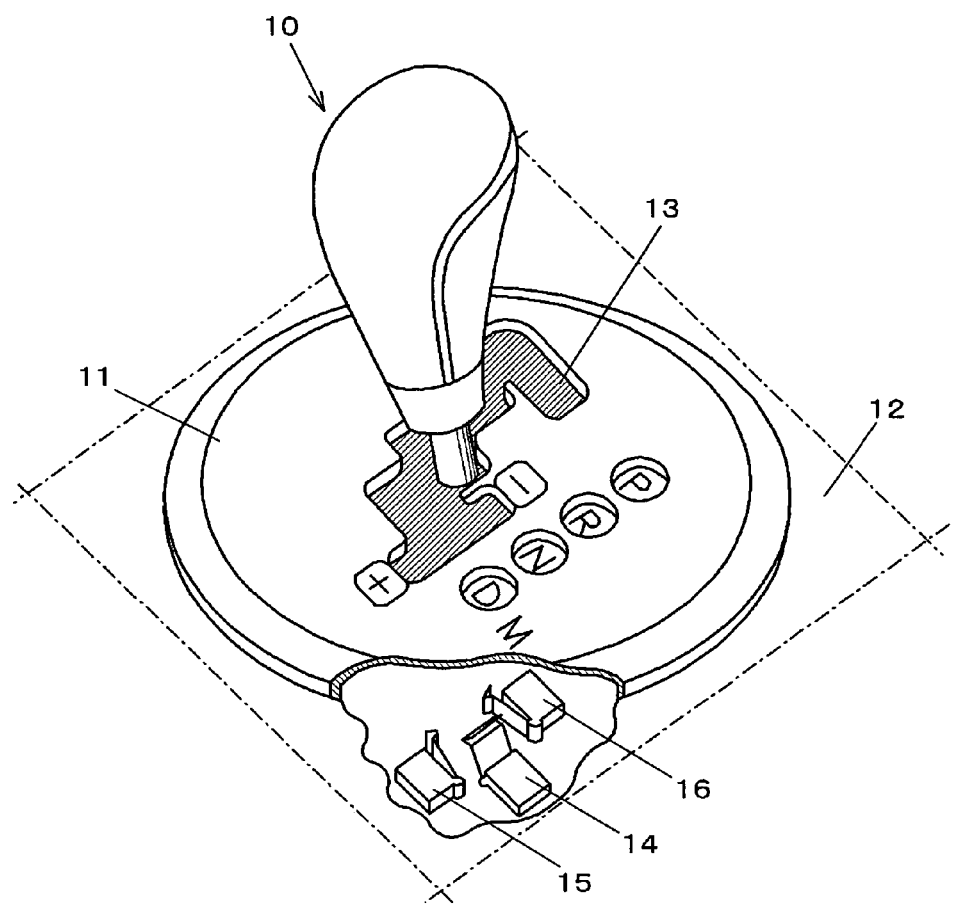
FIG. 3 is a perspective view showing the structure of a shift lever device for use in selection of a shift mode and in selection of a gear position under the condition where an M range is in a selected state.

A shift lever device to be used when a driver selects either one of the P, R or N, or select either one of the D gear range (automatic shift mode) and the M gear range (manual shift mode), or selects a gear position under the condition where the M gear range or the manual shift mode is in the selected state will be described below. As shown in FIG. 3, the shift lever device comprises a shift lever 10 protruding upward from a cover 11 attached to a console 12 disposed between the driver's seat and a front passenger seat. The cover 11 is formed with a shift gate 13 which is an elongated groove-shaped swing path extending in a frontward/rearward or longitudinal direction of a vehicle body in a zig-zag manner. The shift lever 11 penetrates the shift lever 11 in such a manner that an upper portion thereof protrudes upward from the cover 11.

The cover 11 has a top surface provided with four alphabet elements located, respectively, at illustrated positions in a one-to-one correspondence with the P. R, N and D gear ranges and in this order in a rearward direction. Four side edges of the shift gate 13 laterally opposed to the respective alphabet elements serve as shift-lever positions for selecting the P, R, N and D gear ranges. A driver can move the shift lever 10 between these shift-lever positions to select one of the P, R, N and D gear ranges.

In a vehicle automatic transmission having the above shift lever device, in the state when the D gear range or forward gear range is selected, a gear position is automatically shifted according to a predetermined shift pattern. Further, the M gear range is provided as the forward gear range in addition to the D gear range. The automatic transmission is designed to allow the driver to swing the shift lever 10 in the longitudinal direction so as to manually shift between a plurality of gear positions. As with the above shift-lever positions for selecting the P, R, N and D gear ranges, a shift-lever position for selecting the M gear range (hereinafter referred to as "M region") is located along the shift gate 13. The M region includes a center position serving as a neutral position, an front end position serving as a shift-down position for shifting to the next lower gear position, and a rear end position serving as a shift-up position for shifting to the next higher gear position.

The shift lever device includes an M gear-range switch 14 below the cover 11 and the console 12, a shift-up switch 15 disposed on the front side of the M gear-range switch 14 and a shift-down switch 16 on the rear side of the M gear-range switch 14 or on the opposite side of the shift-up switch 15 with respect to the M gear-range switch 14.

When the shift lever 10 is swung rightward (in FIG. 4) to switch from the D gear range to the M gear range, the M gear-range switch 14 is turned on. When the shift lever 10 is swung leftward (in FIG. 4) to switch from the M gear range to the D gear range, the M gear-range switch 14 is turned off.

Then, when the shift lever 10 set in the M region is swung rearward or toward the shift-up position, the shift-up switch 15 is turned on. When the shift lever 10 set in the M region is swung frontward or toward the shift-down position, the shift-down switch 16 is turned on.

Figure 4:
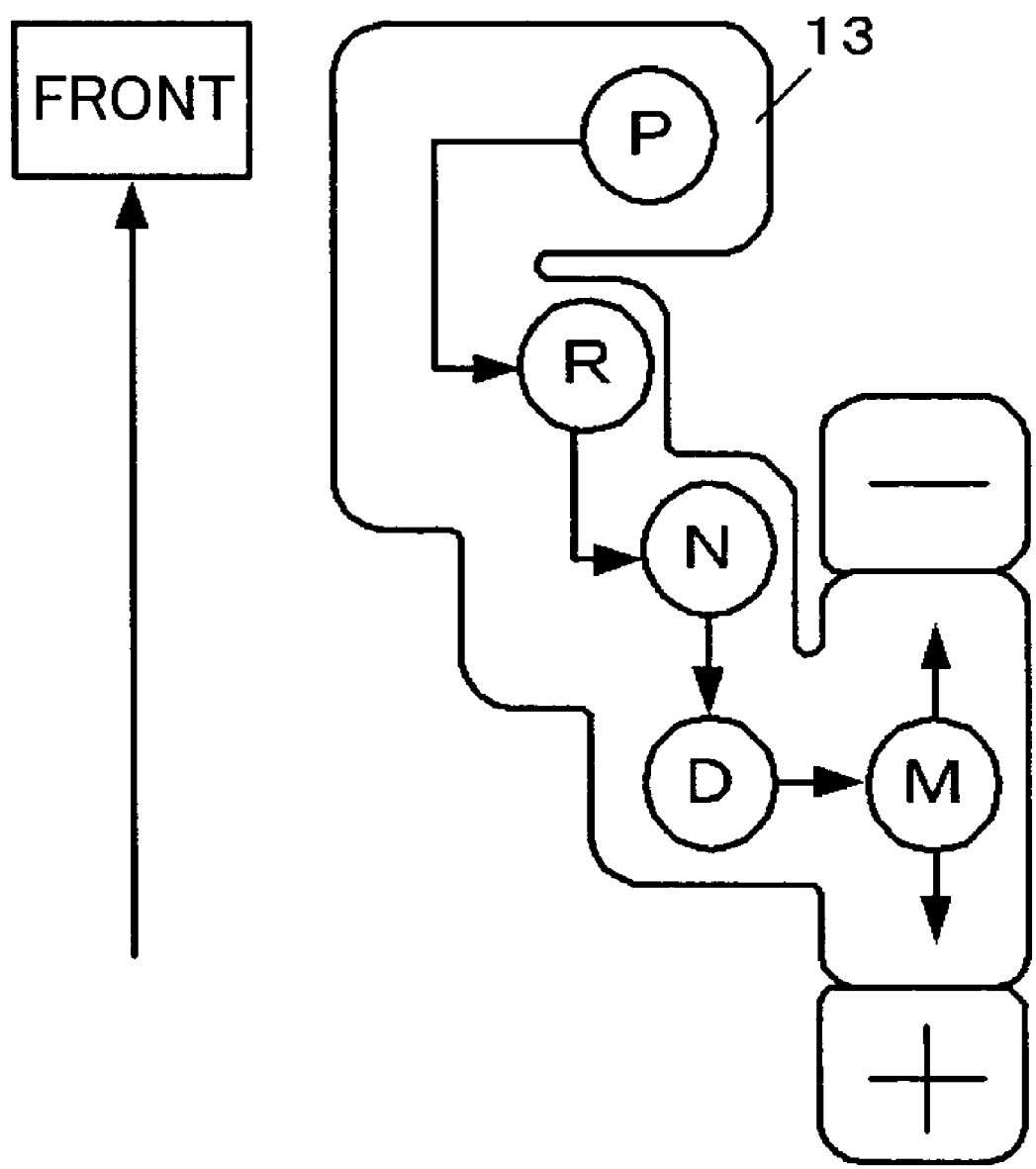
FIG. 4 is a top plan view showing the configuration of a shift gate of the shift lever device.

FIG. 4 shows the configuration of the shift gate 13 illustrated in FIG. 3. As seen in FIG. 4, a shift lever position for selecting the P gear range can be moved stepwise along in directions indicated by the arrows to select each of the R, N and D ranges, and the shift lever 10 set in the M region can be swung frontward and rearward to manually select one of the gear positions.

The gear range selected under the condition where the auto shift mode is in a selected state or the gear position selected under the condition where the manual shift mode is in the selected state, by the driver using the above shift lever device, is indicated by the indicator cluster 5 of the indicator device 1 to allow the driver to readily check and recognize the selected gear range or the selected gear position without largely changing a direction of the driver's eyes during driving.

Figure 5:
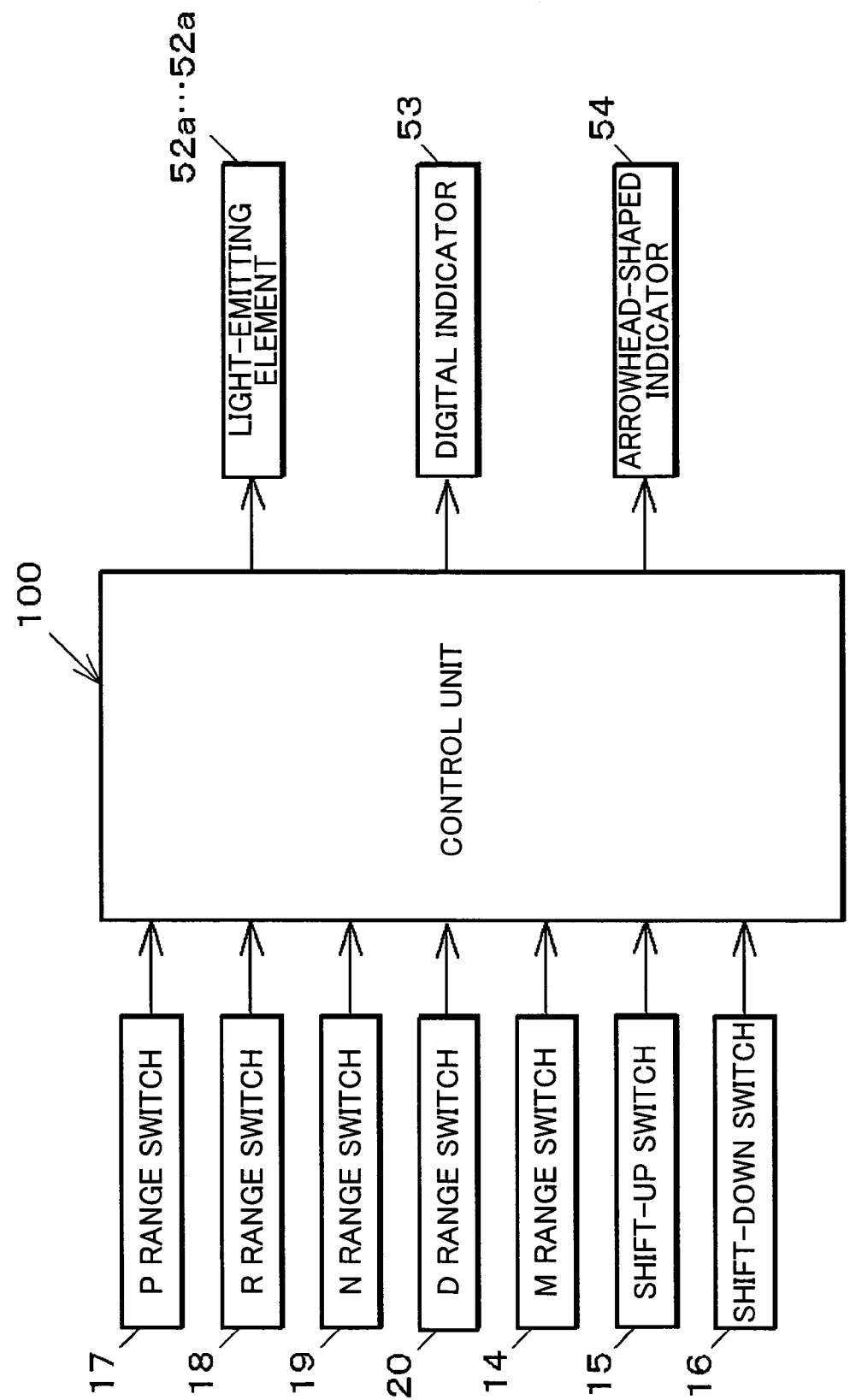
FIG. 5 is a block diagram showing an electrical configuration of the indicator device according to the first embodiment.

An operation of the indicator device 1 according to the first embodiment illustrated in FIG. 1 will be described with reference to a block diagram of FIG. 5. A control unit 100 is operable, in response to receiving an ON signal from one of a P gear-range switch 17, an R gear-range switch 18 and an N gear-range switch 19, to detect the selection of the gear range associated with the gear-range switch and send a control signal to the light-emitting element 52a corresponding to the gear-range switch. The control unit 100 is also operable, in response to receiving an ON signal from a D gear-range switch 20, to detect the selection of the automatic shift mode and send a control signal to the digital indicator 53. Further, the control unit 100 is operable, in response to receiving an ON signal from an M gear-range switch 14, to detect the selection of the manual shift mode and send a control signal to the digital indicator 53 and the arrowhead-shaped indicator 54.

An indication mode of the indicator cluster 5 in each case where a driver actually moves the shift lever 10 to select either one of the P, R and N gear ranges in a course of selecting the automatic shift mode, to select either one of the D and M gear ranges, and to select one of the gear position under the condition where the manual shift mode is in the selected state, will be described below.

Figure 6:
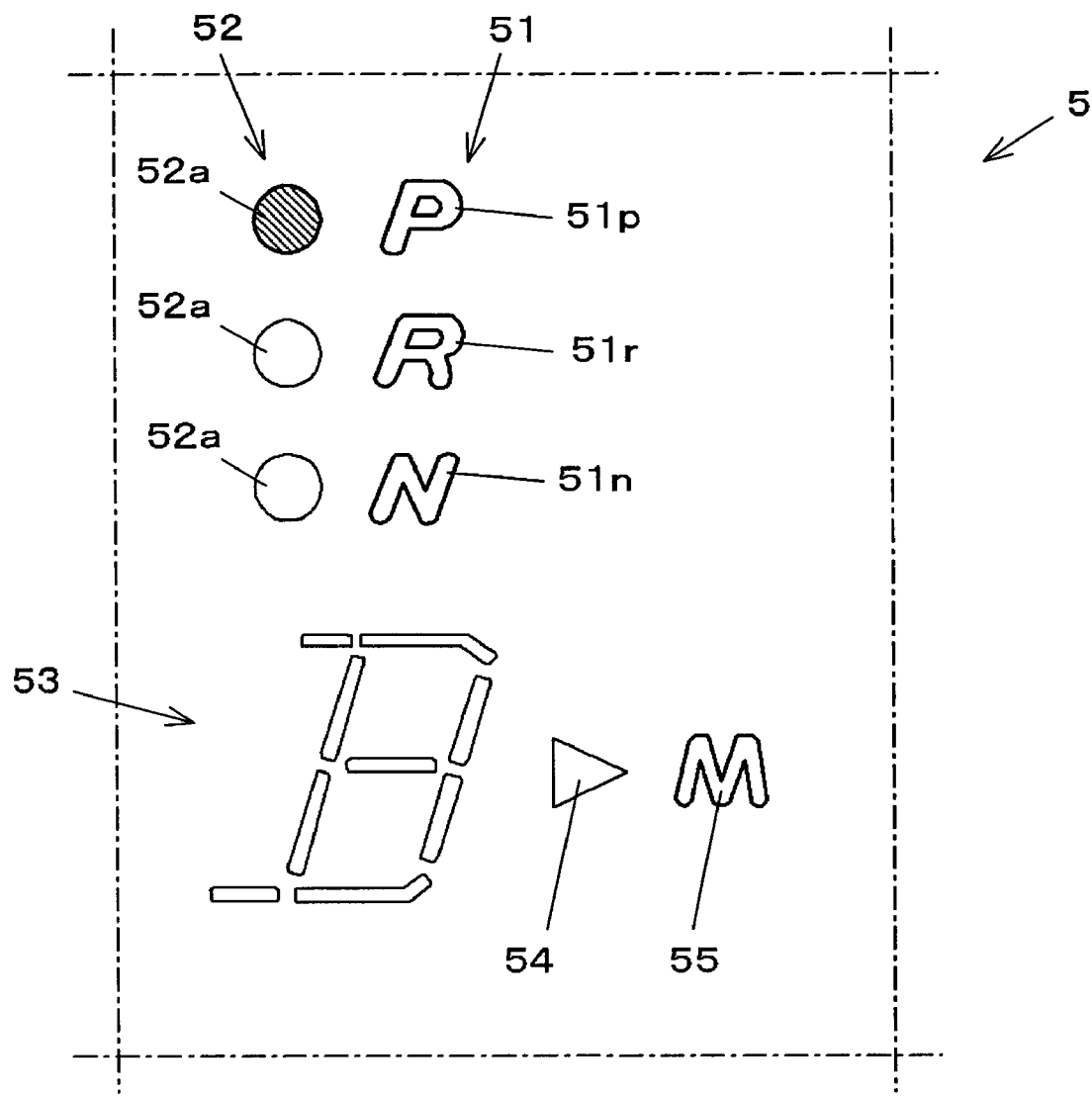
FIG. 6 is an enlarged view showing an indication mode of the indicator section in a state when either one of P, R and N gear ranges is selected.

Firstly, as shown in FIG. 6, for example, when the P gear range is selected from the P, R and N gear ranges, the light-emitting element 52a of the gear-range indicator group 51 located on the left side of the alphabet character "P" 51p corresponding to the P gear range is lighted up to indicate the selection of the P gear range. At this moment, the digital indicator 53 below the gear-range indicator group 51 is inactivated without indicating any gear range and gear position, and the arrowhead-shaped indicator 54 on the right side of the digital indicator 53 is not lighted up.

Figure 7:
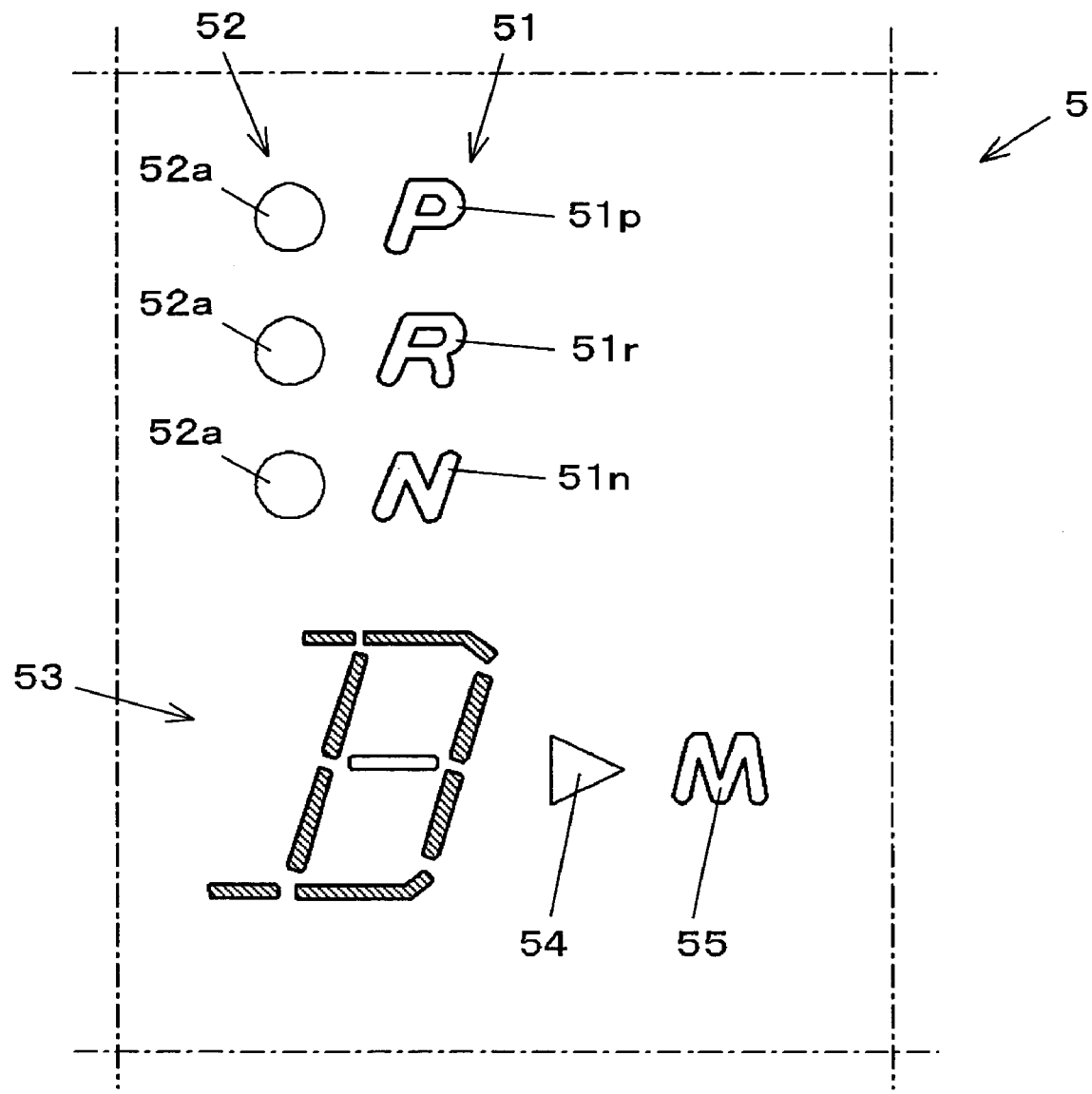
FIG. 7 is an enlarged view showing an indication mode of the indicator section in a state when a D gear range in an automatic shift mode is selected.

As shown in FIG. 7, when the D gear range is selected through the operation for selecting the automatic shift mode, an alphabet character "D" is displayed on the digital indicator 53 to indicate the selection of the D gear range. At this moment, neither the gear-range indicator lamp 52 nor the arrowhead-shaped indicator 54 is lighted up.

Figure 8:
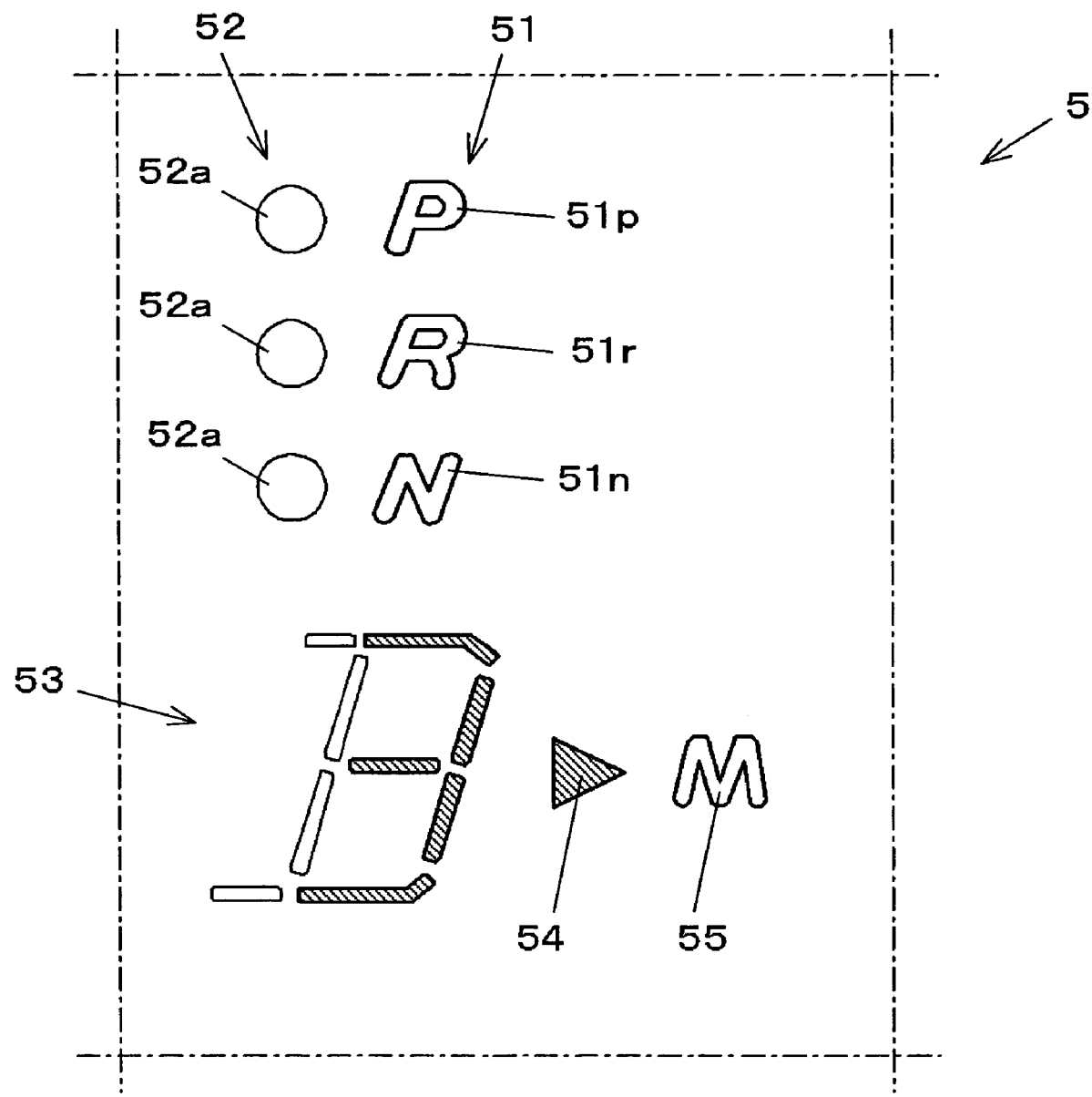
FIG. 8 is an enlarged view showing an indication mode of the indicator section in a state when the manual mode is selected.

As shown in FIG. 8, for example, when a 3rd gear position is selected under the condition where the manual shift mode is in the selected state, a numeric character "3" is displayed on the digital indicator 53 to indicate the selection of the 3rd gear position, and the arrowhead-shaped indicator 54 on the right side of the digital indicator 53 is lighted up to indicate the selection of the manual shift mode. At this moment, the gear-range indicator lamp 52 is not lighted up.

As above, the light-emitting element 52a corresponding to each of the P, R and N gear ranges selected in the course of selecting the automatic shift mode is lighted up, and the alphabet character "D" is displayed on the digital indicator 53 when the D gear range is selected. Further, the alphabet character representing the gear position selected under the condition where the manual shift mode is in the selected state is displayed on the digital indicator 53. Thus, in a layout space for the gear-range indicator cluster 51 and the gear-range display lamp 52, a part of the layout space corresponding to the D gear range can be eliminated to provide enhanced space efficiency of the indicator device 1.

This also makes it possible to reduce the number of components so as to avoid increase in production cost of the indicator device 1. In particular, when the D gear range is selected through the operation for selecting the automatic shift mode, the alphabet character "D" is displayed in a highlighted manner on the digital indicator 53 composed of a plurality of segments. This makes to possible to offer enhanced visibility for a driver when the D gear range is selected.

Further, in the above embodiment, when either one of the P, R and N gear ranges is selected in a state of detection of the auto shift mode, the digital display 53 is deactivated. This makes it possible to emphasize the indication of each of the light-emitting elements 52a, 52a, 52a so as to offer enhanced visibility for a driver to allow the driver to readily recognize one selected from the P, R and N ranges.

In the above embodiment, when the manual shift mode is selected, the arrowhead-shaped indicator 54 on the left side of the M gear-range indicator 55 is lighted up to additionally indicate the selection of the manual shift mode. This makes it possible to allow the driver to more reliably recognize which of the automatic shift mode and the manual shift mode is currently selected.

In the above embodiment, the character "D" is displayed on the digital indicator 53 in a larger size than that of the indication of each of the light-emitting elements 52a, 52a, 52a. This makes it possible to provide further enhanced visibility in the digital indicator 53 when the D gear range is selected through the operation for selecting the automatic shift mode or when the gear position is selected under the condition where the manual shift mode is in the selected state.

As described in connection with FIG. 6, when either one of the P, R and N gear ranges is selected, the digital display 53 can be deactivated to emphasize the indication of each of the light-emitting elements 52a, 52a, 52a so as to effectively offer enhanced visibility for a driver. Further, the following modification may be used as one alternative for obtaining the same effect when either one of the P, R and N gear ranges is selected.

Figure 9:
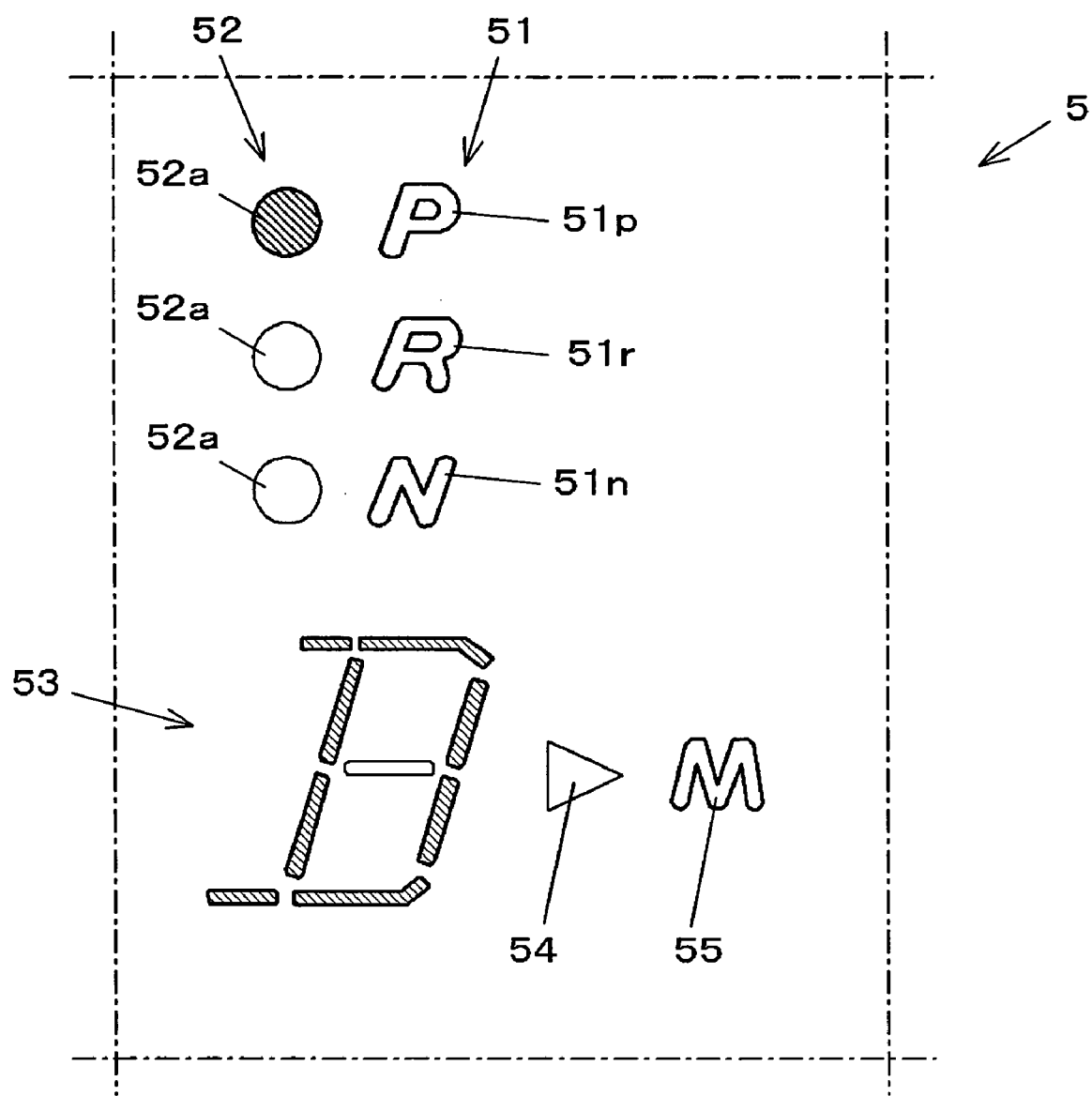
FIG. 9 is an enlarged view showing one modification of the indication mode in FIG. 6, in a state when either one of P, R and N gear ranges is selected.

As shown in FIG. 9, the digital indicator 53 may be designed to have "a less evocative indicator color" than that of the light-emitting element 52a. Where the term "less evocative indicator color" in this specification is meant to be a color having color components (RGB Color-Components) that are more similar to color components of a color of its background area. For instance, when a color of a background area (area surrounding those indicators 51, 53, 54, 55, & light emitting elements 52) is red, then a color orange for the digital indicator 53 is less evocative color than a color white as the color components of orange are closer to that of color red of the background area than the color components of white. Thus the greater the degree of discrepancies of the color components with respect to the color components of a background is, the greater evocative color is. Alternatively, the digital indicator 53 may be designed to have the same color as that of the light-emitting element 52a, and have lower indicator brightness than that of the light-emitting element 52a. This makes it possible to unobtrusively indicate the character "D" on the digital display 53 relative to the indication of the light-emitting element 52a so as to allow a driver to recognize the light-emitting element 52a with enhanced visibility.

Figure 10:
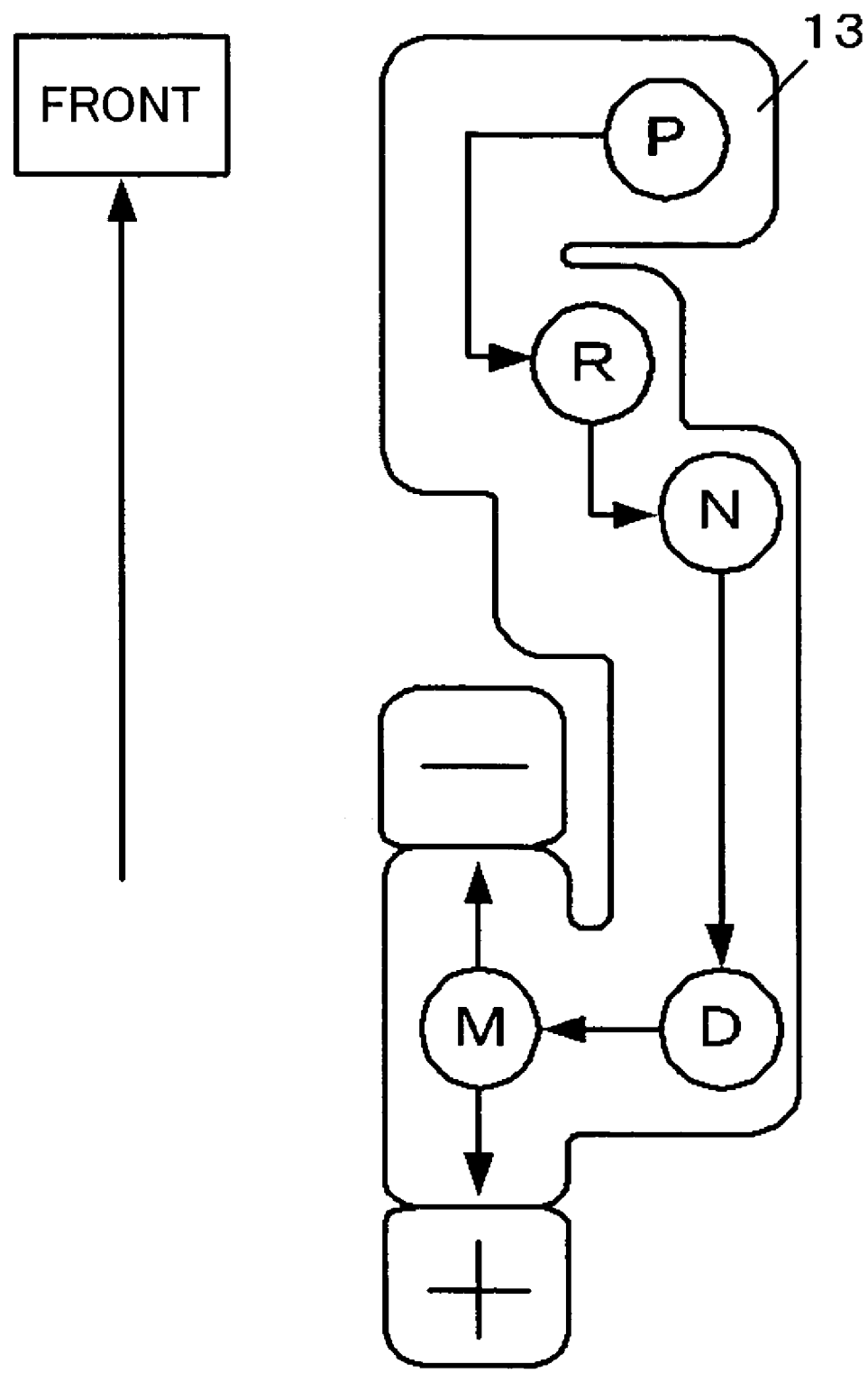
FIG. 10 is a top plan view showing one modification of the configuration of the shift gate in FIG. 4.

FIG. 10 shows one modification of the configuration of the shift gate illustrated in FIG. 4. While this shift gate is increased in longitudinal length of a path extending from a shift-lever position "N" to a shift-lever position "D" as compared with the shift gate illustrated in FIG. 4, and thereby requires a larger longitudinal space, a path extending from the shift-lever position "D" to a shift-lever position "M" is oriented leftward differently from the shift gate illustrated in FIG. 4 to allow the shift gate to have a compact configuration in a width or lateral direction.

Second Embodiment

An indicator device according to a second embodiment of the present invention will be described below. In the second embodiment, the description about the same or similar element or component as/to that in the first embodiment will be omitted.

Figure 11:
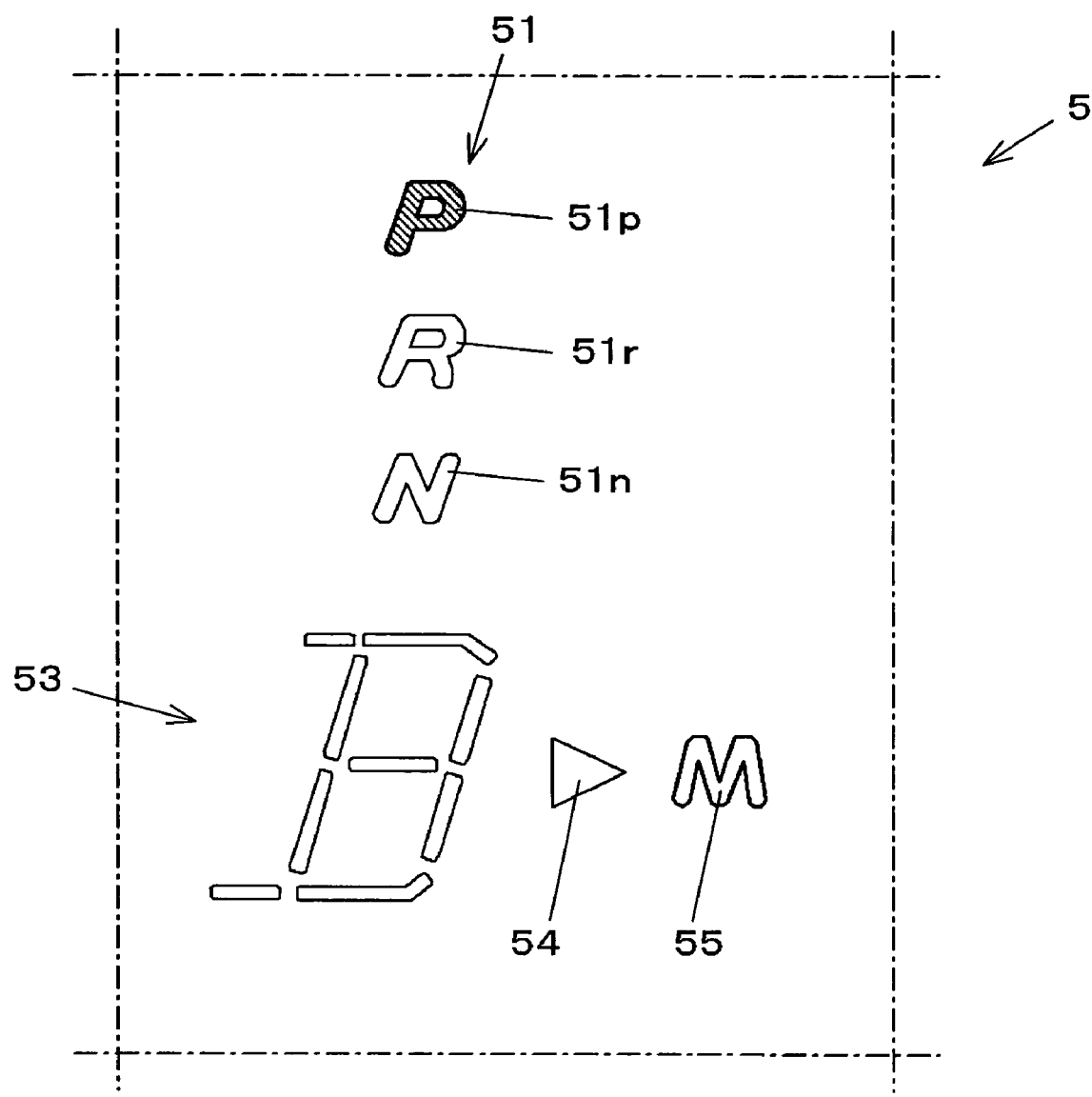
FIG. 11 is an enlarge view showing an indication mode of an indicator section of an indicator device according to a second embodiment of the present invention, in a state when either one of P, R and N gear ranges is selected.

As shown in FIG. 11, in the second embodiment, the gear-range indicator group 51 and the gear-range indicator lamp 51 in the display cluster 5 of the indicator device 1 are integrated together as three alphabet character elements 51p, 51r, 51n. Specifically, for example, when the P gear range is selected, the alphabet character element 51p corresponding to the P gear range is lighted up instead of the light-emitting element.

That is, this indicator device is designed to light up the alphabet character element corresponding to a selected one of the P, R and N gear ranges, or display an alphabet character "D" on the digital indicator 53 when the D gear range (automatic shift mode) is selected, or display on the digital indicator 53 a numeric character corresponding to the gear position selected under the condition where the manual shift mode is in the selected state. This makes it possible to further eliminate a layout space for the gear-range indicator lamp 52 as compared with the first embodiment so as to provide enhanced space efficiency of the indicator device 1. Further, as with the first embodiment, when the D gear range is selected, the alphabet character "D" can be displayed in a highlighted manner on the digital indicator 53 composed of a plurality of segments so as offer enhanced visibility for a drive.

While this indicator device is designed to light up the arrowhead-shaped indicator 54 on the left side of the M gear-range indicator 55 is lighted up when the manual shift mode is selected so as to additionally indicate the selection of the manual shift mode, as with the first embodiment, the arrowhead-shaped indicator 54 may be omitted, and the M gear-range indicator 55 on the right side of the M gear-range indicator 55 may be designed to be lighted up.

Other Embodiment

Figure 12:
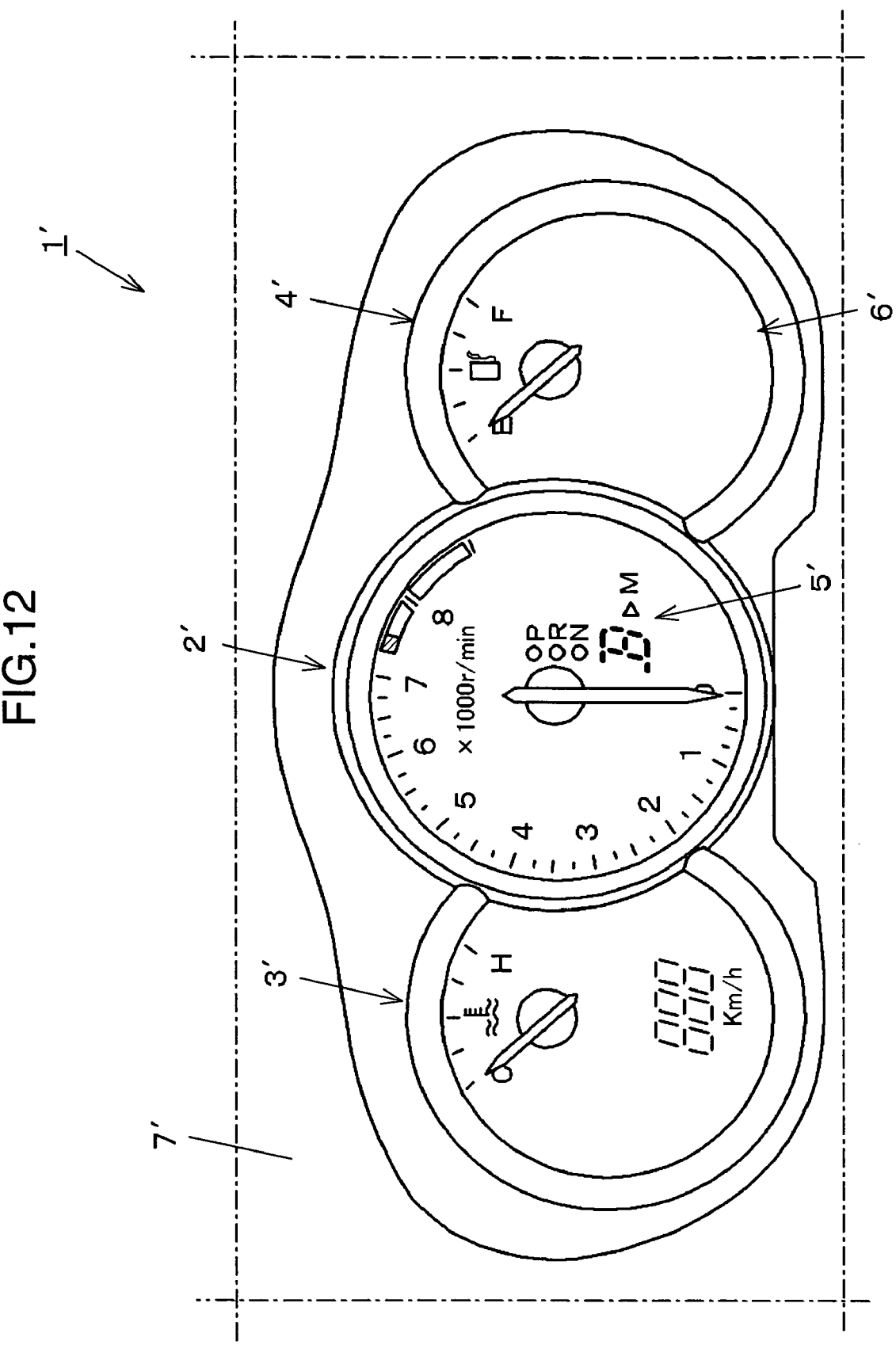
FIG. 12 is a general arrangement diagram of an indicator device according to another embodiment of the present invention which is applied to a vehicle with a left-hand steering wheel.

FIG. 12 shows an indicator device 1' according to another embodiment of the present invention which is applied to a vehicle with a left-hand steering wheel. As with the aforementioned indicator device 1', this indicator device 1' is incorporated in an instrument panel 7' in front of a driver's seat. The indicator device 1' has a central region provided with a tachometer 2' for indicating a rotation speed of a crankshaft during engine operations, a left region (relative to tachometer 2') provided with a coolant temperature gauge 3', and a right region provided with a fuel gauge 4'. Further, the indicator device 1 has an indicator cluster 5' for indicating a gear range selected by a driver, and a gear position selected by a driver under the condition where an M gear range or a manual shift mode is in a selected state, in an approximately central portion of the tachometer 2', and a speed meter 6' for indicating a vehicle speed, at a position below the coolant temperature gauge 3'.

Figure 13:
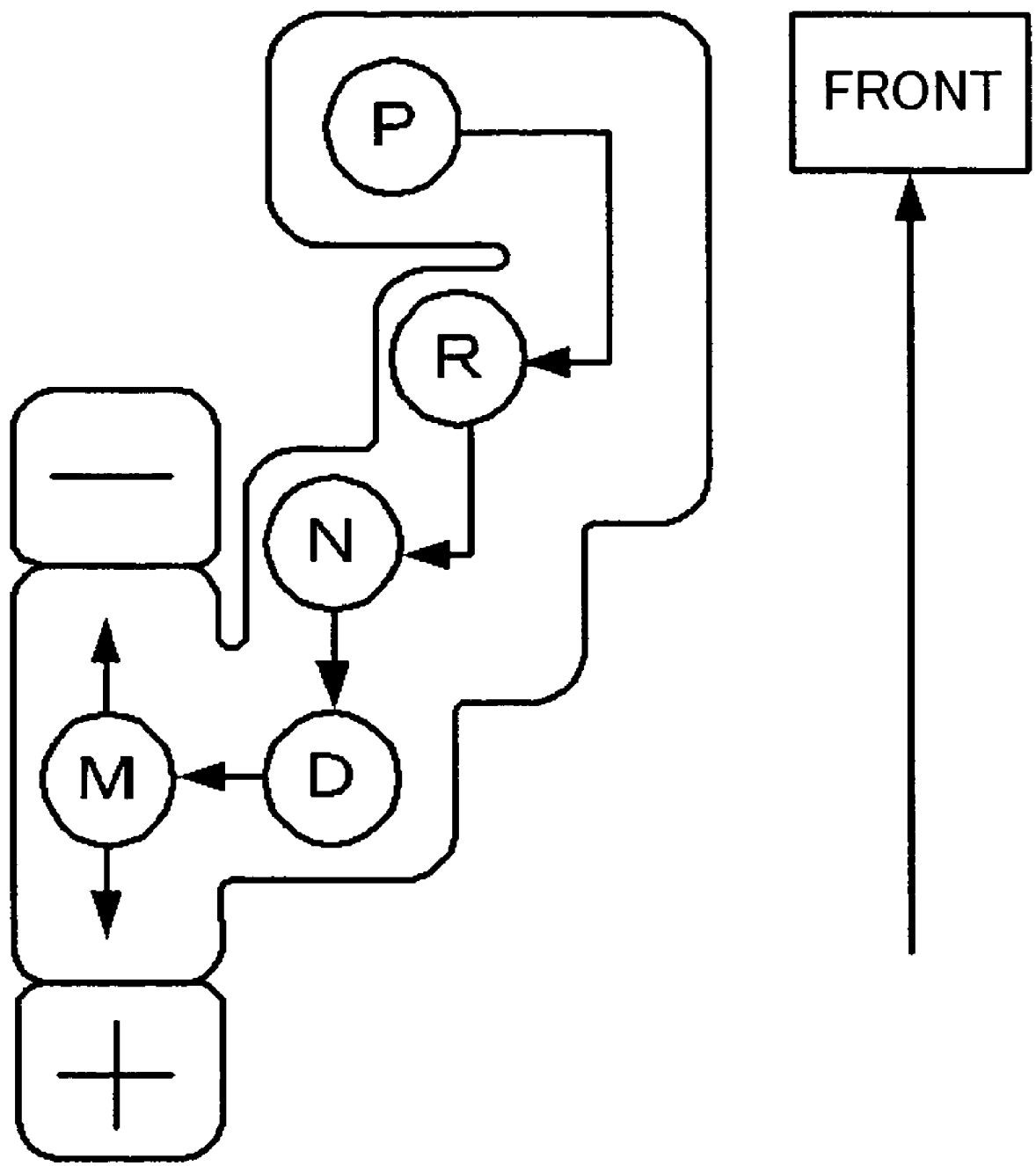
FIG. 13 is a top plan view showing one example of the configuration of a shift gate for use in the indicator device in FIG. 12.
Figure 14:
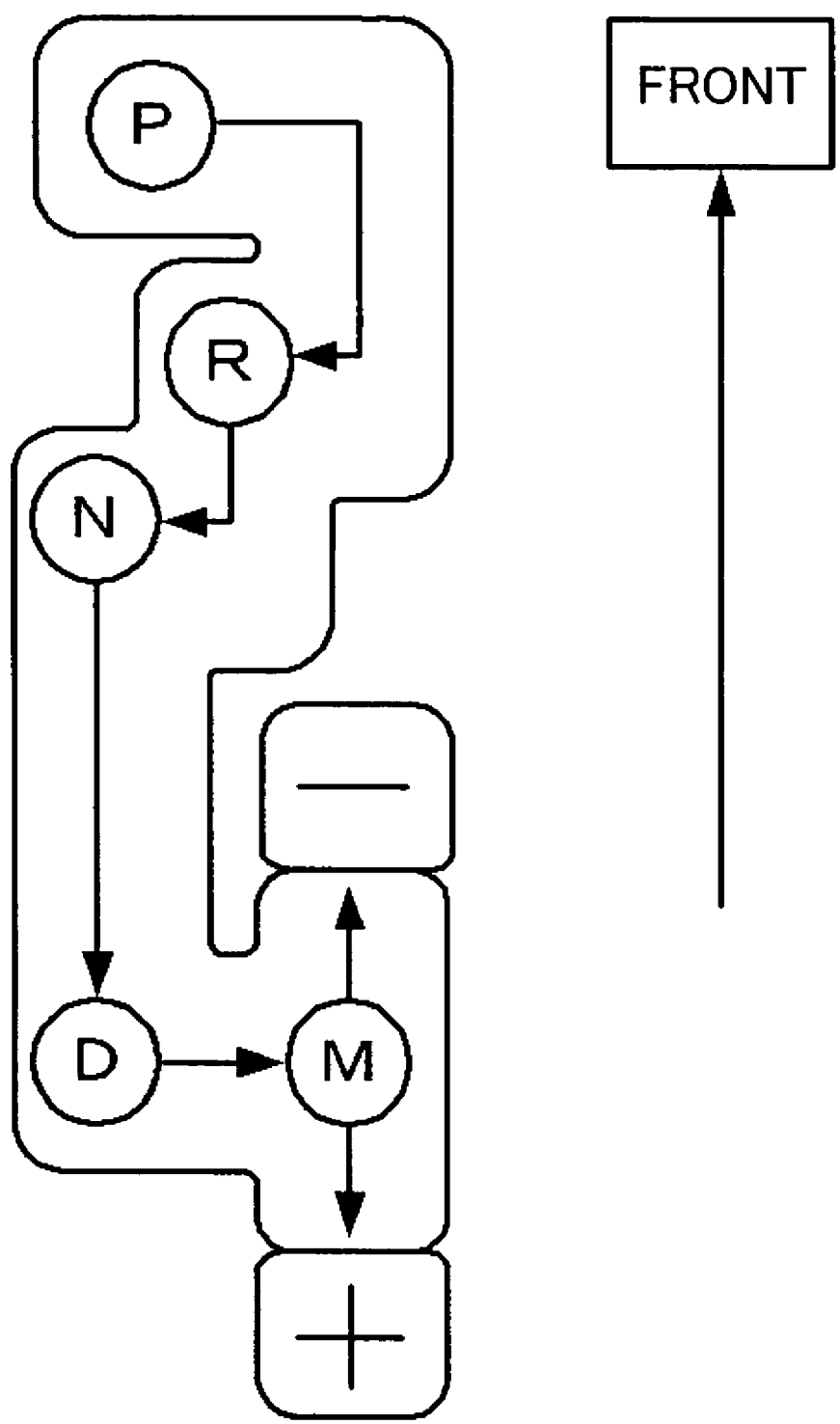
FIG. 14 is a top plan view showing another example of the configuration of a shift gate for use in the indicator device in FIG. 12.

This indicator device 1' is designed to indicate in the indicator cluster 5' an alphabet character representing a gear range selected by the driver according to movement of a shift lever or a numeric character representing a gear position selected in a state when an M gear range is selected. As compared with the indicator device 1 illustrated in FIG. 1, the respective positions of the coolant temperature gauge 3' and the fuel gauge 4' are reversed in a horizontal direction. Correspondingly, as shown in FIG. 13, the configuration of a shift gate is reversed relative to that of the shift gate illustrated in FIG. 4 in a horizontal direction. Another shift gate as one modification of the shift gate illustrated in FIG. 13 has a configuration reversed relative to that of the shift gate illustrated in FIG. 11 in a horizontal direction, as shown in FIG. 14. While the shift gate illustrated in FIG. 14 is increased in longitudinal length of a path extending from a shift-lever position "N" to a shift-lever position "D" as compared with the shift gate illustrated in FIG. 13, and thereby requires a larger longitudinal space, a path extending from the shift-lever position "D" to a shift-lever position "M" is oriented rightward differently from the shift gate illustrated in FIG. 13 to allow the shift gate to have a compact configuration in a width or lateral direction.

INDUSTRIAL APPLICABILITY

As mentioned above in detail in connection with the specific embodiments, the present invention can provide an indicator device for a vehicle with an automatic transmission, capable of utilizing a space of an instrument panel with higher efficiency and offering enhanced visibility for a driver, while avoiding increase in production cost. Thus, the present invention has a wide industrial applicability in a technical field of indicator device for a vehicle with an automatic transmission.

In sum, the present invention provides an indicator device for a vehicle with an automatic transmission, which is designed to be selectable between an automatic shift mode and a manual shift mode and to be selectable between a plurality of gear ranges. The indicator device comprises: shift-mode detector for detecting whether the manual shift mode is selected by a driver; gear-range detector for detecting each of the gear ranges selected by the driver in an operation for selecting the automatic shift mode; gear-position detector for detecting a gear position selected by the driver when the manual shift mode is in a selected state; and indicator for indicating each of the gear ranges selected in the operation for selecting the automatic shift mode, and the gear position selected when the manual shift mode is in the selected state, the indicator including a first gear-range indicator section which has a plurality of linearly-arranged alphabet and/or symbol elements adapted to be selectively lighted up so as to indicate either one of a non-drive gear range and a reverse gear range, or a combination of a plurality of linearly-arranged alphabet and/or symbol characters representing the non-drive gear range and the reverse gear range and a plurality of linearly-arranged light-emitting elements each disposed in side-by-side relation to a corresponding one of the alphabet and/or symbol characters, and a second gear-range indicator section adapted to indicate an alphabet character and/or a symbol character representing a forward gear range by using a plurality of segments; and indication controller for controlling the indicator in such a manner that, under the condition where the shift-mode detector detects that the auto shift mode is in a selected state, the first gear-range indicator section is operable, when the selection of either one of the non-drive gear range and the reverse gear range is detected by the gear-range detector, to light up one of the alphabet or symbol elements or one of the light-emitting elements which is corresponds to the selected gear range, and the second gear-range indicator section is operable, when the selection of the forward gear range is detected by the gear-range detector, to indicate the alphabet character and/or the symbol character representing the forward gear range, and, under the condition where the shift-mode detector detects that the manual shift mode is in the selected state, the second gear-range indicator section is operable to indicate the gear position detected by the gear-position detector.

In the above indicator device of the present invention, under the condition where the auto shift mode is in a selected state, the first gear-range indicator section is operable, when the selection of either one of the non-drive gear range and the reverse gear range is detected, to light up one of the alphabet or symbol elements or one of the light-emitting elements which is corresponds to the selected gear range, and the second gear-range indicator section is operable, when the selection of the forward gear range is detected, to indicate the alphabet character and/or the symbol character representing the forward gear range. Further, under the condition where the manual shift mode is in the selected state, the second gear-range indicator section is operable to indicate the detected gear position. This makes it possible to eliminate a layout space for an alphabet or symbol character or a light-emitting element for indicating the selection of the forward gear range so as to provide enhanced space efficiency of the indicator device and reduce the number of components to avoid increase in production cost. In addition, when the selection of the forward gear range is detected, at least either one of the alphabet and symbol characters representing the forward gear range is indicated in a highlighted manner in the second gear-range indicator section composed of a plurality of segments. This makes to possible to offer enhanced visibility for a driver when the forward gear range is selected.

In a preferred embodiment of the present invention, when the selection of the automatic shift mode is detected, the indication controller controls the indicator in such a manner that the second gear-range indicator section has lower indicator brightness when the selection of either one of the non-drive gear range and the reverse gear range is detected, than that when the selection of the forward gear range is detected.

Alternatively, when the selection of the automatic shift mode is detected, the indication controller controls the indicator in such a manner that the second gear-range indicator section has a less evocative indicator color when the selection of either one of the non-drive gear range and the reverse gear range is detected, than that when the selection of the forward gear range is detected.

According to the above preferred embodiments, when the selection of the automatic shift mode is detected, at least one of the alphabet and symbol characters in the second gear-range indicator section can be unobtrusively indicated relative to the indication of the alphabet or symbol character or the light-emitting element in the first gear-range indicator section so as to allow a driver to recognize a selected one of the non-drive gear range and the reverse gear range with enhanced visibility.

In another preferred embodiment of the present invention, the indicator device further includes additional indicator for additionally indicating that the manual shift mode is selected, in response to detection of the manual shift mode.

According to this preferred embodiment, the additional indicator allows the driver to further reliably recognize a selected one of the non-drive gear range and the reverse gear range, in addition to the selected gear position.

In still another preferred embodiment of the present invention, the second gear-range indicator section is designed to indicate the alphabet character and/or the symbol character thereof in a larger size than that of each of the light-emitting elements or the alphabet and/or symbol elements in the first gear-range indicator section.

According to this preferred embodiment, when the selection of the forward gear range is detected under the condition where the auto shift mode is in the selected state, or when the selection of the gear position is detected under the condition where the manual shift mode is in the-selected state, the second gear-range indicator section can have enhanced visibility when the gear position is detected.

This application claims priority from Japanese Patent Application Serial No. 2005-95194, filed in Japan Patent Office on Mar. 29, 2005, thus the entire contents of which is incorporated by reference. Stated other way, it is deemed that the contents of aforementioned application constitutes part of this application.

Although the present invention has been described in term of specific exemplary embodiments, it will be appreciated that various changes and modifications may be made by those skilled in the art without departing from the spirits and scope of the invention, defined in the following claims.

What is claimed is:

1. An indicator device for a vehicle with an automatic transmission, which is designed to be selectable between an automatic shift mode and a manual shift mode and to be selectable between a plurality of gear ranges, comprising:
   a shift-mode detector for detecting whether said manual shift mode or said auto shift mode is selected by a driver;
   a gear-range detector for detecting each of the gear ranges selected by the driver in an operation for selecting said automatic shift mode;
   a gear-position detector for detecting a gear position selected by the driver when said manual shift mode is in a selected state; and
   an indicator for indicating each of said gear ranges selected in the operation for selecting said automatic shift mode, and said gear position selected when said manual shift mode is in the selected state, said indicator including
      a first gear-range indicator section which has a plurality of linearly-arranged alphabet and/or symbol elements adapted to be selectively lighted up so as to indicate either one of a non-drive gear range and a reverse gear range, or a combination of a plurality of linearly-arranged alphabet and/or symbol characters representing the non-drive gear range and the reverse gear range and a plurality of linearly-arranged light-emitting elements each disposed in side-by-side relation to a corresponding one of said alphabet and/or symbol characters, and
      a second gear-range indicator section adapted to indicate an alphabet character and/or a symbol character representing a forward gear range by using a plurality of segments; and
   an indication controller for controlling said indicator in such a manner that,
      under the condition where said shift-mode detector detects that said auto shift mode is in a selected state, said first gear-range indicator section is operable, when the selection of either one of said non-drive gear range and said reverse gear range is detected by said gear-range detector, to light up one of said alphabet or symbol elements or one of said light-emitting elements which is corresponds to said selected gear range, and
      said second gear-range indicator section is operable, when the selection of said forward gear range is detected by said gear-range detector, to indicate the alphabet character and/or the symbol character representing said forward gear range, and,
      under the condition where said shift-mode detector detects that said manual shift mode is in the selected state, said second gear-range indicator section is operable to indicate the gear position detected by said gear-position detector.

2. The indicator device according to claim 1, wherein, when the selection of said automatic shift mode is detected, said indication controller controls said indicator in such a manner that said second gear-range indicator section has lower indicator brightness when the selection of either one of said non-drive gear range and said reverse gear range is detected, than that when the selection of said forward gear range is detected.

3. The indicator device according to claim 1, wherein, when the selection of said automatic shift mode is detected, said indication controller controls said indicator in such a manner that said second gear-range indicator section has a less evocative indicator color when the selection of either one of said non-drive gear range and said reverse gear range is detected, than that when the selection of said forward gear range is detected.

4. The indicator device according to claim 1, which includes an additional indicator for additionally indicating that said manual shift mode is selected, in response to detection of said manual shift mode.

5. The indicator device according to claim 1, wherein said second gear-range indicator section is designed to indicate said alphabet character and/or the symbol character thereof in a larger size than that of each of said light-emitting elements or said alphabet and/or symbol elements in said first gear-range indicator section.

6. An indicator device for a vehicle with an automatic transmission, which is designed to be selectable between an automatic shift mode and a manual shift mode and to be selectable between a plurality of gear ranges, comprising:
   shift-mode detection means for detecting whether said manual shift mode is selected by a driver;
   gear-range detection means for detecting each of the gear ranges selected by the driver in an operation for selecting said automatic shift mode;
   gear-position detection means for detecting a gear position selected by the driver when said manual shift mode is in a selected state; and
   indication means for indicating each of said gear ranges selected in the operation for selecting said automatic shift mode, and said gear position selected when said manual shift mode is in the selected state, said indication means including
      a first gear-range indicator section which has a plurality of linearly-arranged alphabet and/or symbol elements adapted to be selectively lighted up so as to indicate either one of a non-drive gear range and a reverse gear range, or a combination of a plurality of linearly-arranged alphabet and/or symbol characters representing the non-drive gear range and the reverse gear range and a plurality of linearly-arranged light-emitting elements each disposed in side-by-side relation to a corresponding one of said alphabet and/or symbol characters, and a second gear-range indicator section adapted to indicate an alphabet character and/or a symbol character representing a forward gear range by using a plurality of segments; and indication control means for controlling said indication means in such a manner that, under the condition where said shift-mode detection means detects that said auto shift mode is in a selected state, said first gear-range indicator section is operable, when the selection of either one of said non-drive gear range and said reverse gear range is detected by said gear-range detection means, to light up one of said alphabet or symbol elements or one of said light-emitting elements which is corresponds to said selected gear range, and said second gear-range indicator section is operable, when the selection of said forward gear range is detected by said gear-range detection means, to indicate the alphabet character and/or the symbol character representing said forward gear range, and, under the condition where said shift-mode detection means detects that said manual shift mode is in the selected state, said second gear-range indicator section is operable to indicate the gear position detected by said gear-position detection means.

7. The indicator device according to claim 6, wherein, when the selection of said automatic shift mode is detected, said indication control means controls said indication means in such a manner that said second gear-range indicator section has lower indicator brightness when the selection of either one of said non-drive gear range and said reverse gear range is detected, than that when the selection of said forward gear range is detected.

8. The indicator device according to claim 6, wherein, when the selection of said automatic shift mode is detected, said indication control means controls said indication means in such a manner that said second gear-range indicator section has a less evocative indicator color when the selection of either one of said non-drive gear range and said reverse gear range is detected, than that when the selection of said forward gear range is detected.

9. The indicator device according to claim 6, which includes additional indication means for additionally indicating that said manual shift mode is selected, in response to detection of said manual shift mode.

10. The indicator device according to claim 6, wherein said second gear-range indicator section is designed to indicate said alphabet character and/or the symbol character thereof in a larger size than that of each of said light-emitting elements or said alphabet and/or symbol elements in said first gear-range indicator section.

* * * * *